United States Patent
Cheng

[19]

[11] Patent Number: 6,047,351
[45] Date of Patent: Apr. 4, 2000

[54] JITTER FREE INSTRUCTION EXECUTION

[75] Inventor: Chuck Cheuk-wing Cheng, Saratoga, Calif.

[73] Assignee: Scenix Semiconductor, Inc., Mountain View, Calif.

[21] Appl. No.: 08/989,365

[22] Filed: Dec. 12, 1997

[51] Int. Cl.[7] .................. G06F 9/38; G06F 9/46; G06F 9/30

[52] U.S. Cl. .............. 710/266; 710/260; 710/264; 712/241; 712/245

[58] Field of Search .................. 382/181; 712/237, 712/240, 233, 238, 235, 200, 241, 245; 714/12, 55; 710/264, 48, 266, 260

[56] References Cited

U.S. PATENT DOCUMENTS

| | | | |
|---|---|---|---|
| 5,142,634 | 8/1992 | Fite et al. .................. | 712/240 |
| 5,161,226 | 11/1992 | Wainer .................. | 710/264 |
| 5,287,467 | 2/1994 | Blaner et al. .................. | 712/235 |
| 5,303,378 | 4/1994 | Cohen .................. | 710/264 |
| 5,511,219 | 4/1996 | Shimony et al. .................. | 712/35 |

*Primary Examiner*—Daniel H. Pan
*Attorney, Agent, or Firm*—Fenwick & West LLP

[57] ABSTRACT

A microcontroller including a streamlined pipeline processor provides a predictable time period for executing a set of instructions including branch instructions. The microcontroller has a program counter, branch stack and pipeline stages that can be loaded in a single cycle, and allows only the execution stage of the pipeline to alter the CPU state. Thus, the instructions in stages preceding the execution stage can be annulled, and the necessary registers can be updated in the first cycle upon determination of a branch instruction. In subsequent cycles, instructions in the branch routine will flow through the pipeline, one stage per cycle. Thus, a fixed period for responding to a branch instruction is provided. A fixed period for responding to an interrupt is also provided, as is a selectable interrupt schedule for predictable instruction execution in a multi-tasking operation.

12 Claims, 6 Drawing Sheets

JITTER FREE INSTRUCTION EXECUTION

CROSS REFERENCE TO RELATED APPLICATIONS

This application is related to application Ser. No. 08/989,935, filed on Dec. 12, 1997, now U.S. Pat. No. 5,894,549, by Chuck Cheuk-wing Cheng, and entitled "SYSTEM AND METHOD FOR FAULT DETECTION IN MICROCONTROLLER PROGRAM MEMORY," the entire contents of which are hereby incorporated by reference.

BACKGROUND OF THE INVENTION

1. Field of the Invention

This application relates generally to microcontrollers, and more particularly to jitter free execution of instructions.

2. Description of the Related Art

A modem semiconductor microcontroller is basically a low-cost computer adapted to provide rapid solutions to external events after intensive computation. The microcontroller senses the occurrence of external events through input ports and provides solutions through output ports after computation in a Central Processing Unit (CPU). The CPU usually operates in conjunction with on-chip peripherals to achieve this. The typical microcontroller also has an on-chip program ROM to store its instructions, an on-chip data RAM to store data, an oscillator driver to generate the system clock and application specific peripherals such as timers, analog comparators, and others.

Microcontrollers are used in various applications. Many households have over a hundred of them. For example, they are used in microwave ovens, TVs, calculators, remote controls, clocks, security alarm systems, toys, refrigerators, radios, stereo systems, telephones, and elsewhere.

Microcontrollers often receive input, from the user or otherwise, and produce a corresponding desired output according to its instructions. For instance, in a microwave oven, a microcontroller senses keyed input from the user and heats food for the selected interval and power level. The microcontroller also tracks the real time and variously notifies the user, such as via an audible alarm upon the completion of heating.

In certain applications, microcontrollers are embedded in control systems. For example, they are used to control manufacturing machines in assembly lines. Also, numerous microcontrollers are used in automobiles, to provide functions such as controlling anti-lock brakes.

Microcontrollers control and sense many timing sensitive events. Thus, to optimize operation, microcontrollers should execute instructions in a predictable, predefined time period. For example, in generating a sine wave, an output pin voltage should be updated at certain fixed intervals depending on the targeted frequency. If the update interval is not fixed, then the quality of the produced sine wave will degrade. Similarly, provision of fixed intervals on the input side can ensure accurate measurement.

Several factors can affect the amount of time required for executing a set of instructions. If this amount of time is not known to the programmer, or is not precisely predictable, there can be an adverse impact on various operations, such as the above-mentioned timing sensitive operations. One factor that affects the amount of time is whether the number of cycles required to execute an instruction is consistent. Also, the response to branch instructions and interrupts affects the amount of time required for executing a set of instructions. Further, for a modern multi-tasking microcontroller, the time allocated to the execution of the various tasks, as well as the branch and interrupt response times, can adversely affect various timing sensitive operations and events. The uncertainty regarding the duration of execution for a segment of instructions, or the time for responding to a branch or interrupt, can be referred to as jitter.

There remains a need for jitter free execution of instructions, particularly for multi-tasking microcontrollers.

SUMMARY OF THE INVENTION

The microcontroller constructed in accordance with the present invention includes a streamlined pipeline processor that facilitates a fixed response to both branches and interrupts. The microcontroller can also incorporate a built-in timer that facilitates a selectable task interruption schedule.

The microcontroller provides a fixed response period when a branch instruction or an interrupt is encountered. The microcontroller includes a pipelined processor having a plurality of stages including an execution stage. When a branch instruction is encountered, the program counter is loaded with the branch target address, instructions in plural pipeline stages are annulled, and the address following the branch instruction is loaded into a branch stack. Preferably, all of these functions take place in one cycle.

In one embodiment, the instructions in two stages (IF and OF) preceding the execution stage are annulled. Also, registers in those stages, as well as the branch stack and program counter, are flip-flop based and can be loaded in a single cycle. Further, the microcontroller is arranged such that only the execution stage directly affects the CPU state, thus, allowing disregard of the instructions in certain remaining stages (e.g. IF and OF).

Subsequent to flushing the pipeline by annulling the instructions, and the other operations in the first cycle upon a branch instruction determination, instructions are funneled through the pipeline to the execution stage. Thus, the branch response time is fixed, and can be determined by the number of stages in the pipeline. In one embodiment, it always takes three clock cycles to respond to a branch instruction.

The microcontroller also provides a fixed response period when an interrupt signal is received. When an instruction is interrupted, it is not executed and is loaded into an interrupt stack. In the same clock cycle, the instructions in plural stages of the pipeline are annulled, as with the branch response, and the program counter is loaded with the first instruction address in the interrupt subroutine. Subsequent to these first cycle operations, instructions flow through the pipeline to the execution stage. Thus, it takes a fixed period of time (e.g. 3 clock cycles) to execute the first instruction in the interrupt routine, and instructions thereafter execute each clock cycle.

The provision of this fixed response period allows the programmer to accurately determine the time that it will take to execute a segment of program code. In contrast to conventional microcontrollers which, inter alia, can have unpredictable branch and interrupt response times, the microcontroller constructed in accordance with the present invention provides jitter free instruction execution.

The microcontroller also preferably incorporates plural interrupts at a selectable time period such that a series of interrupts are generated at fixed intervals. Thus, in addition to providing the fixed interrupt response period, an interrupt service subroutine can allocate fixed periods to tasks (subject to a priority scheme) in a multi-tasking application. This further facilitates predictable microcontroller operation, particularly in conjunction with timing sensitive input and output.

DETAILED DESCRIPTION OF THE INVENTION

Figure 1:
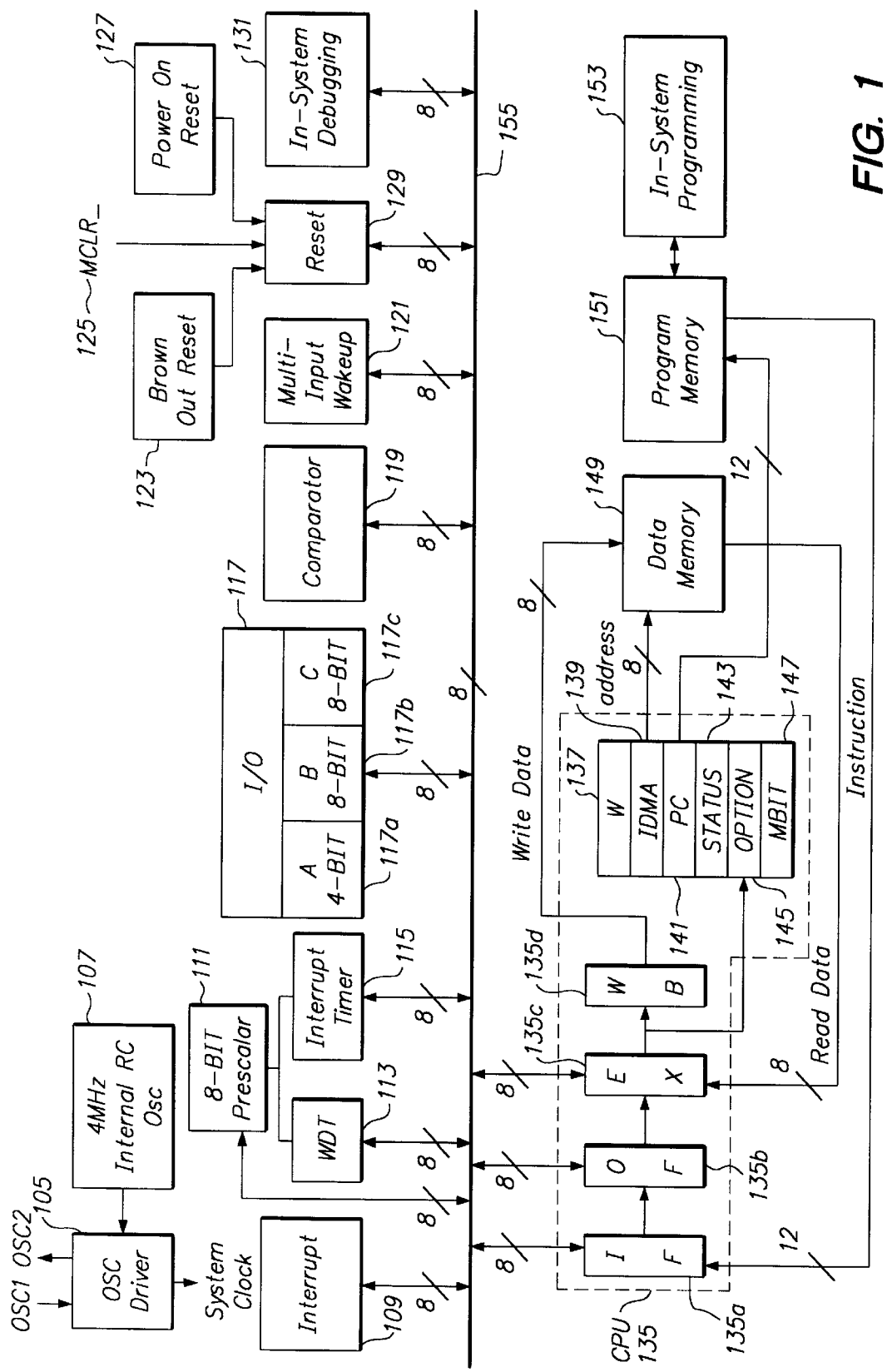
FIG. 1 is a block diagram of an embodiment of a microcontroller in accordance with the present invention.

FIG. 1 is a block diagram of a microcontroller 101 in accordance with the present invention. The microcontroller 101 may be used to control operation of any device or system, for example, a microwave oven, an alarm unit, or an antilock braking system that incorporates the microcontroller 101. The microcontroller 101 components include an oscillator driver 105, an internal oscillator 107, an interrupt block 109, a prescalar block 111, a watchdog timer 113, an interrupt timer block 115, an input/output block 117, a comparator 119, a multi-input wakeup block 121, a brown-out reset block 123, an external pin line 125, a power on reset block 127, an in-system debugging block 131, a central processing unit ("CPU") 135, a data memory 149, a program memory 151, an in-system programming block 153, and a data bus 155. Further, the central processing unit 135 includes special registers such as a word ("W") register 137, an indirect data memory address ("IDMA") register 139, a program counter ("PC") register 141, a status register 143, an option register 145, and a mode ("MBIT") register 147.

The internal oscillator 107 is coupled to the oscillator driver 105. The prescalar block 111 is coupled to the watchdog timer 113 and the interrupt timer block 115. The brown out reset block 123, the external pin line 125, and the power on reset block 127 are coupled to the reset block 129. The interrupt block 109, the prescalar block 111, the watchdog timer block 113, the timer block 115, the input/output block 117, the comparator 119, the multi-input wakeup block 121, the reset block 129, and the in-system debugging block 131 are all coupled to the data line 155.

The central processing unit 135 is coupled to the data memory 149, the program memory 151, and the data bus 155. Particularly, the word register 137, the program counter register 141, and the mode register 147 are coupled to the data memory 149. The program counter register 141 is coupled to the program memory 151. Also, the program memory 151 is coupled to the in-system programming block 153.

It is noted that in a preferred embodiment the input/output block 117 is a multiport input/output block that includes, for example, a first port, A, 117a, a second port, B, 117b, and a third port, C, 117c, where each port is coupled to the data bus 155. The first port 117a may be a 4-bit port while the second the third ports 117b, 117c may be 8-bit ports. Each pin of each port 117a, 117b, 117c can be set as an input or an output port. The central processing unit 135 can input data or output data to the ports 117a, 117b, 117c through the particular port's respective pin or pins.

The internal oscillator 107 may be a 4 MHz internal oscillator. The 4 MHz signal may be generated from an internal resistor and capacitor ("RC") circuit. Further, the interrupt timer block 115 may be an 8-bit timer block and the prescalar block 111 may also be an 8-bit prescalar block.

The central processing unit 135 includes four pipeline stages. The pipeline stages may be conceptually referenced as the instruction fetch ("IF") stage 135a, the operand fetch ("OF") stage 135b, the execution ("EX") stage 135c, and the write back ("WB") stage 135d. The IF stage 135a is coupled to the OF stage 135b, the program memory 151, and the data bus 155. The OF stage 135b is coupled to the EX stage 135c and the data bus 155. The EX stage 135c is coupled to the WB stage 135d, the special registers 137–145, the data memory 149, and the data bus 155. Once a result of executing the instruction are determined, the result can be written to a register or memory. The WB stage 135d is shown coupled to the data memory 149 for storing instruction results. The various special registers can be construed as included within the WB stage 135d as well.

Turning now to the functionality of the microcontroller 101, the oscillator driver 105 is coupled to receive external oscillation signals to generate system clock or timing signals for the microcontroller 101 itself, as well as other components of a microchip that includes the microcontroller 101. The external oscillation signals may, for example, be derived from crystal oscillators, resonators, or resistors and capacitors depending on the oscillation mode chosen. Moreover, the oscillator driver 105 may distribute a clock signal generated by the internal oscillator 107.

The interrupt block 109 generates and handles interrupt signals for components of the microcontroller 101. The source of the interrupt signals may be from, for example, a timeout of the interrupt timer block 115 or a clock signal edge transition on the second port 117b of the input/output block 117. An interrupt signal from the interrupt block 109 halts the execution of a current instruction and saves the address corresponding to the current instruction in an interrupt stack. Simultaneously, the central processing unit 135 jumps to an interrupt service subroutine which may dictate the appropriate instructions to be executed subsequent to the interrupt.

The prescalar block 111, used by both the watchdog timer 113 and the timer block 115, divides down the clock signals, for example, from the oscillator driver 105 by a set number before passing the divided clock signals to the watchdog timer 113 and the interrupt timer block 115. The watchdog timer 113 monitors any irregular activities by generating a reset signal. Once the watchdog timer 113 is enabled, it should be cleared as soon as possible to prevent generating a reset signal to the entire microchip, including the microcontroller 101. The interrupt timer block 115 generates the clock or timing signals that are available to the microcontroller 101 for any general purpose. When enabled, the interrupt timer block 115 enables the interrupt block 109 to generate an interrupt signal.

The comparator 119 compares the values of any two analog signals and generates a digital signal output indicating the result of that comparison. The multi-input wakeup block 121 samples signal transitions on the pins of ports 117a, 117b, 117c of the input/output block 117. If the interrupt block 109 is enabled and the microcontroller 101 is not in a SLEEP mode, the transition will cause an interrupt that halts the components of the microcontroller 101. If the microcontroller 101 is in the SLEEP mode, the transition will wake up the components of the microcontroller 101 to begin operating again.

The power-on reset block 127 generates a reset signal to the reset block 129 when the microchip initially powers on. In turn, the reset block 129 generates reset signal to the entire microcontroller 101. This reset mechanism initializes the registers of the microcontroller 101 and the central processing unit 135.

The brownout reset block 123 generates a reset signal for the reset block 129 when the microcontroller 101 power level dips below a preset or predetermined level. In turn, the reset block 129 generates a reset signal that resets all the components of the microcontroller 101. This reset mechanism prevents the microcontroller 101 from harming the device or system controlled by the microcontroller 101.

A reset signal may also be received from an external source by the microcontroller 101 through the external reset line 125. Upon receiving the reset signal from the external source, the reset block 129 may generate a reset signal to reset all the components of the microcontroller 101.

The in-system debugging block 131 interfaces with an external debugging system. Depending on the command received by the in-system debugging block 131 from external debugging system, the in-system debugging block 131 inserts breakpoints, reads and writes to internal registers. The in-system debugging block 131 allows for a simplified external debugging system because the in-system debugging block 131 performs most of the functions previously completed by conventional emulation systems on the microchip.

The in-system programming block 153 interfaces with an external program. Using clock pins OSC1 and OSC2 that are illustrated with the oscillator driver 105, the in-system programming block 153 allows the microcontroller 101 to communicate serially with external components. Depending on the commands the in-system programming block 153 receives from external programs, the in-system programming block 153 can erase, read, or program the program memory 151.

The program memory 151 may be, for example, an electrically eraseable programmable read-only memory ("EEPROM"). In a preferred embodiment, the program memory 151 uses a 12-bit wide instruction word. The program memory 151 detects the changes in the program counter register 141 address. The program counter register 141 is 12-bits wide and contains an address of an instruction located within the program memory 151. If any bit of the program counter register 141 changes value, the program memory 151 will power up and output the instruction pointed to or addressed by the new program counter register 141 contents. If no bit of the program counter register 141 changes value, the program memory 151 is in a powered down state.

The data memory 149 may be, for example, a static random access memory ("SRAM") or a dynamic random access memory ("DRAM") (or registers). The data memory 149 only samples a control signal, for example, read ("RD") or write ("WE"), at the rising edge of the clock signal generated from the oscillator driver 105. When the data memory 149 senses that at least one of the read control signal or the write control signal is active, the data memory 149 will perform the appropriate write or read, or both, operations. The data memory 149 also stores temporary data and functions as a register file for the central processing unit 135.

In the central processing unit 135, the word register 137 is used by many instructions for storing an operand. In one embodiment, the word register 137 is 8-bits wide. The floating subtract register 139 stores an address pointer into the data memory 149. The program counter register 141 stores an address pointer to the next instruction to be fetched by the central processing unit 135. The status register 143 indicates the current status of the central processing unit 135. For example, the status register 143 may include a carry flag, a zero flag, a power down bit, or a timeout bit. The option register 145 is a control register that configures the microcontroller 101. The mode register 147 is used as a type of temporary register, and in one embodiment is used to transfer data from the program memory 151 to the data memory 149. In one embodiment, the mode register 147 is 4-bits wide.

Further, as stated above, the central processing unit 135 includes a series of pipeline stages for fetching and executing stored instructions. The pipeline stages include the IF stage 135a, the OF stage 135b, the EX stage 135c, and the WB stage 135d. The IF stage 135a reads an instruction from the program memory 151. The OF stage 135b decodes the instruction, determines what operation to perform and determines particular memory operands of the instruction. The EX stage 135c performs the actual operation specified by the instruction using the memory operands. The WB stage 135d stores the results of the actual operation in the data memory 149.

Figure 2:
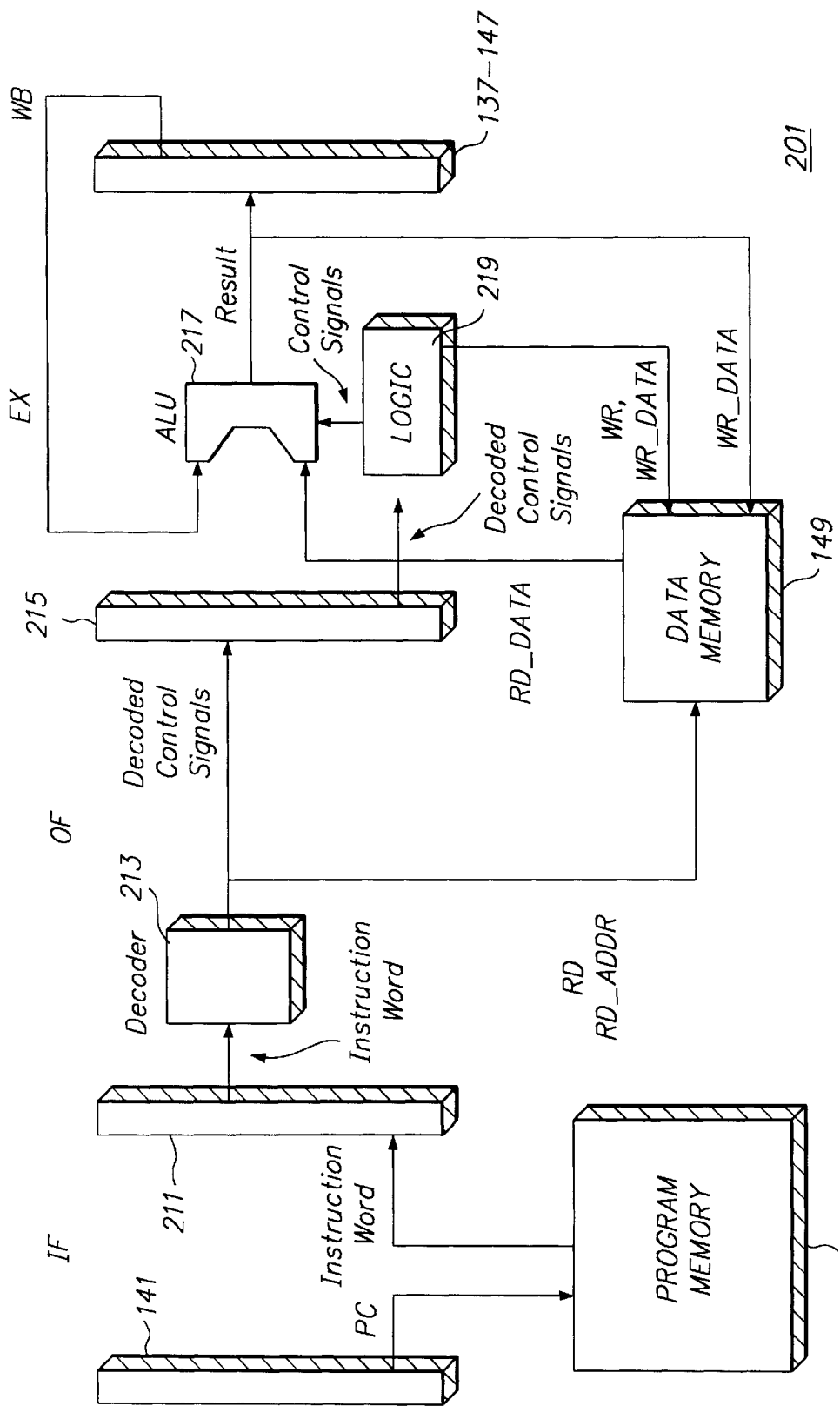
FIG. 2 is a block diagram illustrating an embodiment of the pipeline stages of a central processing unit in accordance with the present invention.

FIG. 2 is a block diagram illustrating an embodiment of a pipeline system 201 comprising pipeline stages 135a, 135b, 135c, 135d in conjunction with other microcontroller elements, constructed in accordance with the present invention. The pipeline system includes the program counter register 141, an instruction register 211, a decoder 213, a decoder register 215, an arithmetic logic unit 217, control logic 219, and special registers 137–147.

In the pipeline system 201, the program counter register 141 and the instruction register 211 of the central processing unit 135 are coupled to the program memory 151. The instruction register 211 is also coupled to the decoder 213. The decoder 213 is coupled to the decoder register 215. The decoder register 215 is coupled to the control logic 219. The control logic 219 is coupled to the arithmetic logic unit 217. The arithmetic logic unit is coupled to the special registers 137–147 (which are construed to be part of the WB stage 135d). The decoder 213, the arithmetic logic unit 217 and the control logic 219 of the central processing unit 135 are coupled to the data memory 149.

When the pipeline system 201 is operational, on a rising edge of the system clock signal, at the IF stage 135a, an instruction is fetched from the program memory 151. The instruction fetched is that instruction pointed to or addressed by the contents of the program counter register 141. It is noted that the instruction is typically a 12-bit instruction word. The program memory 151 passes the addressed instruction to the instruction register 211. On the next rising edge of the system clock signal, at the OF stage 135b, the instruction register 211 passes the instruction to the decoder 213.

At the OF stage 135b, the instruction is preliminarily decoded to begin tasks such as reading data from data memory 149. In the OF stage 135b, bits of the instruction word are interpreted to determine whether this instruction needs to, for example, write or read data from data memory 149, perform any arithmetic logic unit 217 operations, input or output any data through the input/output port 117, or to change any flags in the status register 143. It is noted that the OF stage 135b also generates, if necessary, a read address and/or a read signal to set up a read operation to the data memory 149.

In the OF stage 135b, the instruction word is decoded into one or more control signals and each control signal enables a specific task. Preliminarily decoding the instruction word reduces the time required to completely decode the instruction in EX stage 135c, so that the EX stage 135c has more time available to perform the actual instruction operation.

Once the instruction word is preliminarily decoded, it is passed to the EX stage 135c. The EX stage 135c is where logic operations are performed for executing the instruction. For example, the arithmetic logic unit 217 performs operations such as addition, subtraction, shift-left, shift-right or other logic operations. Also in the EX stage 135c, write operations to the central processing unit 135 special register 137–147, for example, the word register 137 or the floating subtract register 139, are performed. If necessary, in the EX 135c a write address is generated and a write execution signal is prepared for performing a write operation to the data memory 149. Conceptually, the data memory 149 or the special registers 137–147 are part of the WB stage 135d, where results are stored.

Conventional microcontrollers control and sense various timing sensitive events, which demands the execution of sets of instructions in a predetermined time period for optimal performance.

One variable that can affect the duration of execution for a set of instructions is the number of clock cycles required to execute a given instruction in various circumstances. For example, if instruction "A" takes one clock cycle to execute, it should do so under all circumstances, lest the programmer could not accurately determine how long a set of instructions including instruction "A" would take to execute. Existing pipeline microcontrollers can have a variable number of execution cycles (NCYL) for the same instruction, dependent on external factors. For example, for an instruction "iB", NCYL can depend on whether the particular instruction (iB) resides in an instruction cache. If so, it may take less cycles to fetch and execute iB; otherwise, it takes much longer to fetch and execute iB because it needs to go to main memory, usually off-chip DRAM, to fetch iB. Further, if iB is an instruction that reads or writes data, NCYL depends on whether the data is being accessed or not.

Another variable that can affect the amount of time for executing a set of instructions in a conventional microcontroller, particularly one having pipelined processing, is the response time due to an interrupt or branch instruction. Existing microcontrollers typically have an undetermined number of clock cycles to respond to interrupt requests and branch operations. For example, Microchip's 16C7X takes 8 to 16 clock cycles to respond to interrupt. Motorola's 68HC05 takes 44 to 76 clock cycles. Intel's 8051 takes 36 to 108 clock cycles. This variability makes it very difficult for the programmer to accurately control the timing of input/output pins, among other things.

Further, for a multi-tasking microcontroller, the time to respond to interrupt and branch instructions, as well as the transition between tasks and the time required for executing instructions of a task can be variable. Typical microcontrollers may only interrupt at instruction boundaries which, in CISC fashion, are of different length and execution time. All of the discussed sources of variable execution duration introduce "jitter" into the system timing that fundamentally limits performance and accuracy. With this jitter, it is very difficult for the programmer to determine accurately the number of MIPS (million instructions per second) for each task and the overhead for task switching.

The microcontroller described in connection with FIGS. 1 and 2 overcomes these various sources of variable execution duration, and thus provides jitter free instruction execution. For example, the microcontroller facilitates predictable response times in that it uses a fixed, predetermined number of clock cycles to respond to interrupts and branches. Also, the streamlined pipeline of the microcontroller executes all but branch instructions and "MOVIW instructions" in a single clock cycle. The MOVIW instruction takes four clock cycles, to execute and is disclosed in related application Ser. No. 08/989,935 entitled "SYSTEM AND METHOD FOR FAULT DETECTION IN MICROCONTROLLER PROGRAM MEMORY," filed on Dec. 12, 1997, now U.S. Pat. No. 5,894,549 by Chuck Cheuk-wing Cheng. Finally, the fixed interrupt response and an interrupt timing scheme that incorporates the built-in timer 115 allows for jitter free multi-tasking operations.

Figure 3:
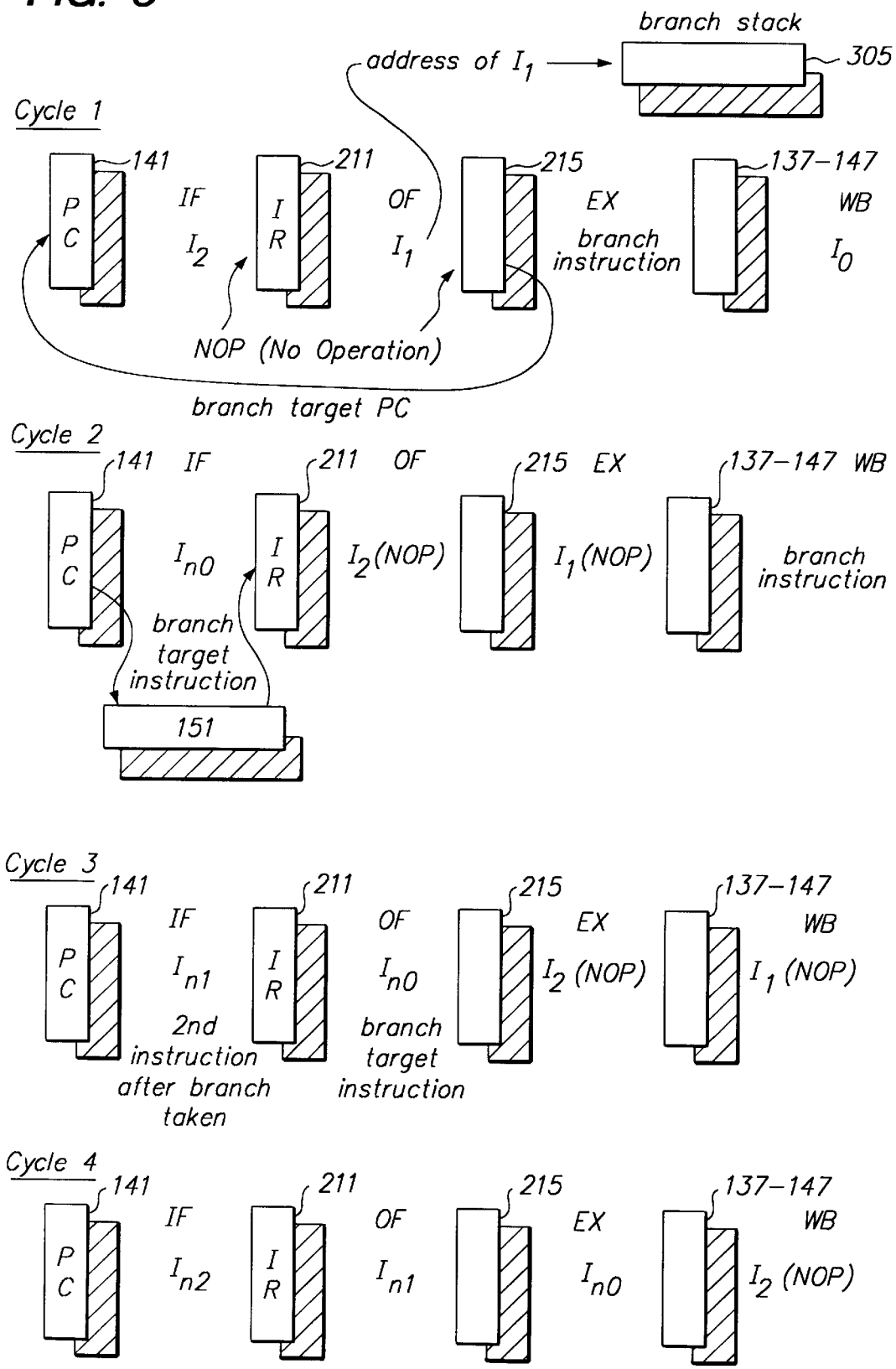
FIG. 3 is a schematic illustrating microcontroller operations for several clock cycles subsequent to a branch instruction in accordance with the present invention.

Referring now to the schematic diagram of FIG. 3, microcontroller operations for several clock signals subsequent to a branch instruction are shown. In the first clock cycle ("cycle 1"), it has been determined that the current instruction in the execution stage is a branch instruction. Such a determination can be made with reference to the decoder register 215 contents, and conventional techniques for detecting a branch instruction.

Where there is a branch instruction (such as shown in FIG. 3), several operations take place in cycle 1. First, the program counter register 141 is loaded with the branch target address for the branch instruction. This is possible because the EX stage 135c is in communication with the PC register 141. Second, the instructions in the IF stage 135a and OF stage 135b are annulled. This is done by loading a NO OPERATION (NOOP) instruction into the instruction register 211 and decoder register 215. Third, the address for the instruction ($I_1$) following the branch instruction is loaded into the branch stack 305.

There are several reasons that the microcontroller can perform the three functions during the same clock cycle, and can replace instructions in certain pipeline stages with NOOPs. For one, the microcontroller is arranged such that only the EX 135c can directly affect the CPU state. For example, as shown in FIG. 1, special registers, such as the STATUS 143 and option 145 registers, are not changed unless an instruction is executed successfully (in the EX stage 135c). Thus, the instructions in the IF stage 135a and OF stage 135b can be disregarded and subjected to NOOP substitution. Further, the branch stack 305, as well as the instruction register 211, decoder register 215 and PC register 141 are preferably implemented with flip-flops, which can be written to in a single clock (e.g., rising edge). Thus, it takes one clock cycle to flush the pipeline and load the PC register 141 with the branch target address.

The remaining cycles shown in FIG. 3 carry the instructions forward as follows. In cycle 2, the branch target instruction (designated $I_n\emptyset$) is fetched. The PC register 141 points to an address location in program memory 151 which includes a 12-bit instruction that is loaded into the instruction register 211. In cycle 3, the branch target instruction is moved to the OF stage 135b. The instruction is appropriately decoded and the operand is fetched, as described with reference to FIG. 2 above. Then, in cycle 4, the branch target instruction $I_n\emptyset$ is executed (EX stage 135c). As shown, instructions following the first instruction in the branch are loaded through the pipeline (designated as $I_n{}^1$ and $I_n{}^2$). Thus, it takes a fixed, predetermined number of cycles (3, in this embodiment) to execute the branch instruction ($I_n\emptyset$), and subsequent instructions are executed for each subsequent clock cycle, until another branch (or an interrupt) is encountered.

Figure 4:
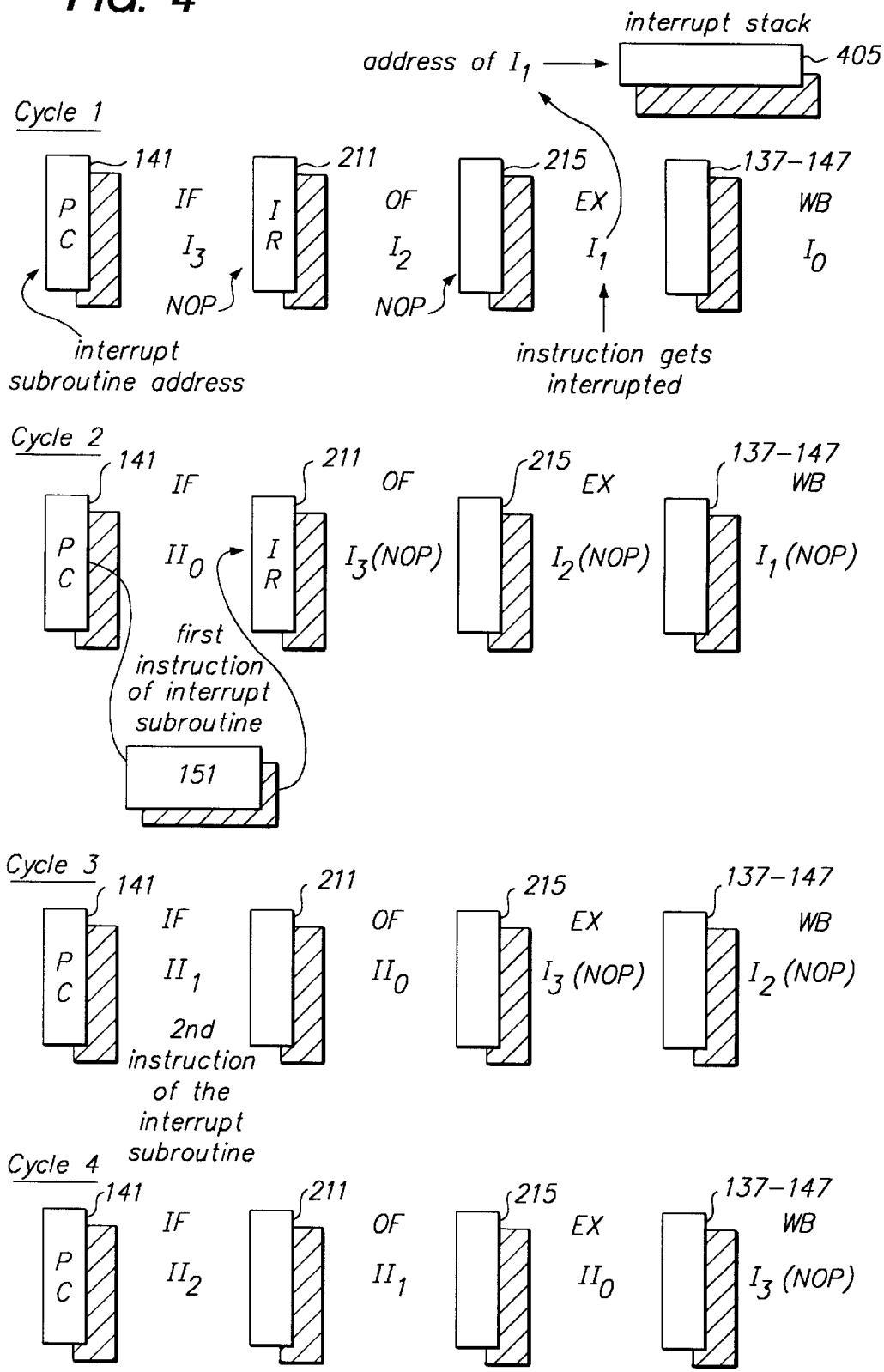
FIG. 4 is a schematic illustrating microcontroller operations for several clock cycles subsequent to an interrupt in accordance with the present invention.

Referring now to the schematic diagram of FIG. 4, microcontroller operations for several cycles subsequent to an interrupt are shown. Here, it is assumed that the interrupt originated from the operation of the interrupt timer block 115. In cycle 1, the instruction $I_1$ is interrupted. Responsive to the interrupt, the PC register 141 is loaded with the interrupt subroutine address. Additionally, the IF stage 135a and OF stage 135b are annulled, such as by replacing the instructions in the instruction register 211 and decoder register with NOOPs. This is facilitated because only the EX stage 135c alters the CPU state, as described regarding the branch operations (FIG. 3). Furthermore, the instruction to have been executed ($I_1$) can also be flushed because the CPU registers are not updated until the end of the clock cycle. Finally, the interrupt stack 405 is loaded with the address of the interrupted instruction $I_1$, and is implemented with flip-flops to accommodate the single cycle update.

In cycle 2, the first instruction of the interrupt subroutine ($II_o$) is fetched in the IF stage 135a. Specifically, the address in the PC register 141 addresses an instruction in the program memory 151 which is loaded into the instruction register 211 in the second clock cycle. In cycle 3, the first instruction ($II_o$) is moved into the OF stage 135b. Specifically, it is loaded into the decoder register 215. The instruction is also decoded by decoder 213 prior to passage to the EX stage 135c, as described with reference to FIG. 2. Finally, in cycle 4, the instruction ($II_o$) is executed Subsequent instructions $II_1$ and $II_2$ are executed in following cycles 5 and 6 (not shown).

Thus, a fixed predetermined number of cycles are consistently encountered in response to an interrupt generated by the interrupt timer block 115 (on an external pin transition). This also makes the time required for entering and exiting an interrupt handler and subroutine call short and deterministic. This in turn gives the programmer advance determination of the amount of time that it will take to execute a segment of code. For multi-tasking, it also allows accurate prediction of the overhead for task switching, which is typically accomplished via interrupts and branches. Finally, the programmer can predict the number of MIPS (million instructions per second) needed for each task, which allows accurate shaping of the input/output timing of the final embedded system.

Figure 5:
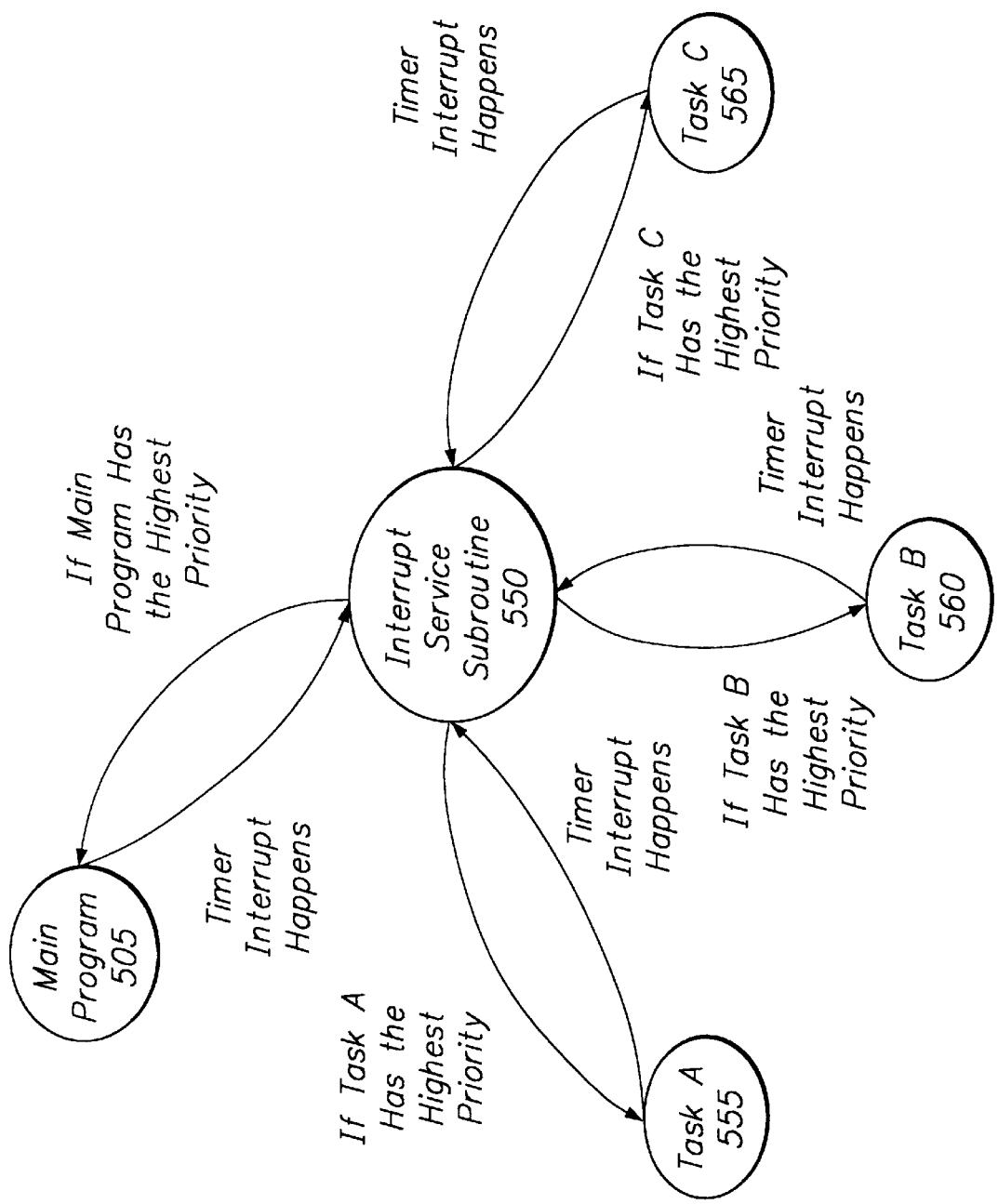
FIG. 5 is a state diagram illustrating microcontroller multi-task operations in accordance with the present invention.

Referring now to the state diagram 500 of FIG. 5, use of the fixed, predetermined interrupt response time in conjunction with the implementation of the generation of interrupts via the interrupt timer block 115 is shown. The interrupt timer block 115 is configured to generate an interrupt at a selected interrupt interval. As described regarding FIG. 1, the interrupt block 109 generates and handles interrupts, and the interrupt timer block 115 can be source of the interrupt. Timing signals are provided to the built-in timer 115 from the prescalar block 111, and the timer 115 timeout (and the corresponding interrupt signal) are provided at the expiration of the selected interrupt interval. Thus, the interrupt timer block 115 can be configured to repeatedly provide an interrupt at a selected interrupt interval.

Figure 6:
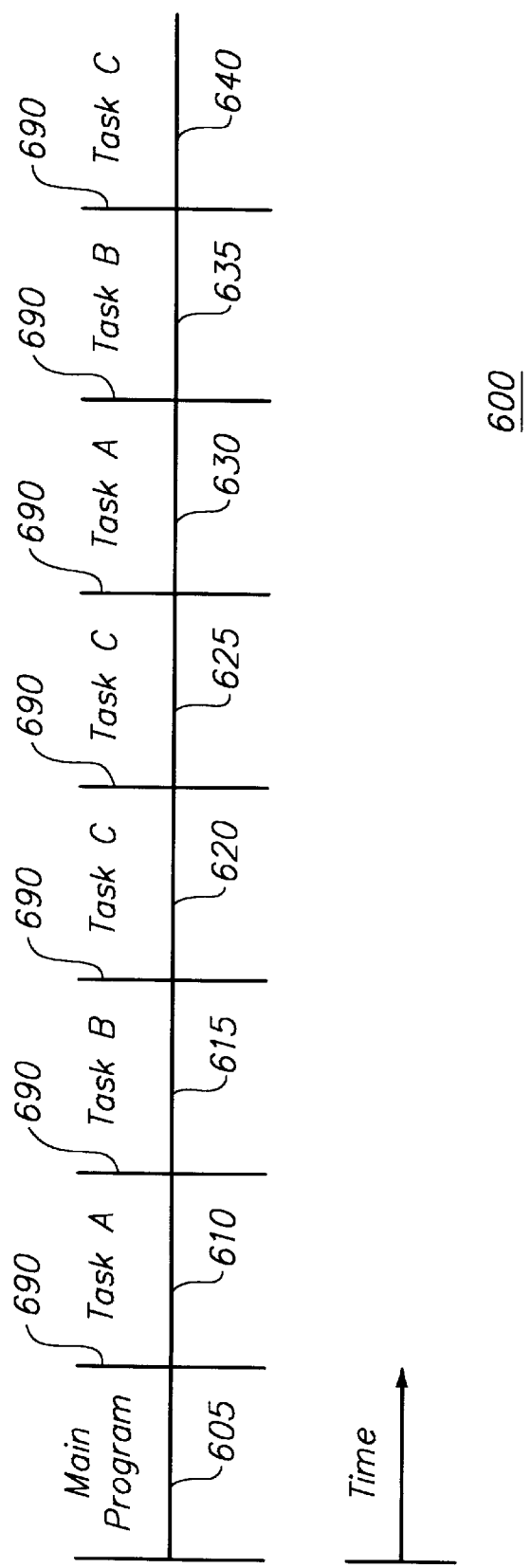
FIG. 6 is a timing diagram illustrating multi-task execution allocation in accordance with the present invention.

Referring to the timing diagram of FIG. 6 along with FIG. 5, jitter free execution in conjunction with multi-tasking, incorporating the selected interrupt interval, facilitates predictable multi-tasking operations.

Initially, it is assumed that instructions in a main program 505 are being executed. The interrupt block 109 then generates and handles an interrupt procedure. Here, the source of the interrupt is assumed to be the timeout of the interrupt timer block 115. Control transitions to an interrupt service subroutine 550, which determines whether the main program 505, TASK A (555), TASK B (560), or TASK C (565) has current priority. Here, as shown in FIG. 6, TASK A is assumed to have priority. Thus, after a fixed predetermined interrupt response period (e.g. three clock cycles) a fixed overhead period for the service subroutine 550, and another fixed response period (from the interrupt service subroutine to the task (e.g. 3 cycles)). TASK A instructions are executed (period 610). After the selected interval, the interrupt timer block 115 timeout again occurs, causing another interrupt. Again, after a fixed interrupt response period, highest priority TASK B instructions are executed (period 615).

This pattern continues and produces, for example, the series of fixed instruction execution periods 605, 610, 615, 620, 625, 630, 635, 640 shown in FIG. 6 Notably, a task can retain priority for plural periods, according to conventional priority schemes implemented by the interrupt service subroutine 550. For instance, TASK C instructions are executed in consecutive periods 620, 625 in the timing diagram of FIG. 6.

In FIG. 6, the demarcation between periods (690) represents a fixed transition. This fixed transition is a result of the operation of the interrupt response period (from current task to the interrupt service subroutine), the fixed overhead for the interrupt service subroutine to determine the next task, and the fixed response period (for branching from the service subroutine to the next task). The overhead for the interrupt service subroutine can be fixed using conventional program techniques. Thus, for example, a consistent 10 clock cycle period for the interrupt fixed service subroutine could be provided. This would provide a sixteen (16) cycle transition between tasks.

The fixed period for responding to interrupts (or even branches within a task execution) and the generation of interrupts at selected intervals facilitates very predictable multitask execution, and allows the provision of accurate information for the implementation of the microcontroller with timing sensitive $I_n\emptyset$.

What is claimed is:

1. For use with a microcontroller including a pipelined processor, a method for providing jitter free execution of a set of instructions comprising:

determining whether an instruction to be executed is a branch instruction;

upon determining that the instruction to be executed is a branch instruction, performing the steps of:

in a first clock cycle, loading a program counter with a target address corresponding to the branch instruction;

in the first clock cycle, loading the address of an instruction following the branch instruction into a stack;

in the first clock cycle, annulling instructions following the branch instruction in a first stage and a second stage of the pipelined processor; and in a second clock cycle, loading a branch target instruction corresponding to the branch target address into the first stage of the pipelined processor.

2. The method of claim 1, wherein only a third stage of the pipelined processor can directly affect the state of the pipelined processor.

3. A microcontroller which provides jitter free execution of instructions, the microcontroller comprising:
   a pipelined processor, including at least first and second stages; and
   a memory, in communication with the pipelined processor and storing instructions that, when executed, cause the processor to perform the steps of:
      determining whether an instruction to be executed is a branch instruction;
      upon determining that the instruction to be executed is a branch instruction, performing the steps of:
         in a first clock cycle, loading a program counter with a target address corresponding to the branch instruction;
         in the first clock cycle, loading the address of an instruction following the branch instruction into a stack;
         in the first clock cycle, annulling instructions following the branch instruction in a first stage and a second stage of the pipelined processor; and
         in a second clock cycle, loading a branch target instruction corresponding to the branch target address into the first stage of the pipelined processor.

4. The microcontroller of claim 3, wherein the pipelined processor further includes a third stage wherein only the third stage of the pipelined processor directly affects the state of the pipelined processor.

5. For use with a microcontroller including a pipelined processor, a method for providing jitter free execution of instructions corresponding to multiple tasks, the method comprising:
   executing a plurality of instructions corresponding to a first task;
   generating an interrupt signal a predetermined amount of time after the commencement of execution of instructions in the first task;
   upon receipt of the interrupt signal, transitioning from the first task to a second task by:
      in a first clock cycle, loading an interrupt stack with an address of an instruction from the first task, wherein execution of the instruction was interrupted by the interrupt signal;
      in the first clock cycle, loading a program counter with an address of an instruction from the second task;
      in the first clock cycle, annulling instructions following the interrupt signal in a first stage and a second stage of the pipelined processor; and
      in a second clock cycle, loading the instruction from the second task into the first stage of the pipelined processor.

6. The method of claim 5, wherein only a third stage of the pipelined processor can directly affect the state of the pipelined processor.

7. A microcontroller which provides jitter free execution of instructions corresponding to multiple tasks, the microcontroller comprising:
   a pipelined processor, including at least first and second stages; and
   a memory, in communication with the pipelined processor, for providing instructions for performing the steps of:
      executing a plurality of instructions corresponding to a first task;
      generating an interrupt signal a predetermined amount of time after the commencement of execution of instructions in the first task;
      upon receipt of the interrupt signal, transitioning from the first task to a second task by:
         in a first clock cycle, loading an interrupt stack with an address of an instruction from the first task, wherein execution of the instruction was interrupted by the interrupt signal;
         in the first clock cycle, loading a program counter with an address of an instruction from the second task;
         in the first clock cycle, annulling instructions following the interrupt signal in a first stage and a second stage of the pipelined processor; and
         in a second clock cycle, loading the instruction from the second task into the first stage of the pipelined processor.

8. The microcontroller of claim 7, wherein the pipelined processor further includes a third stage wherein only the third stage of the pipelined processor directly affects the state of the pipelined processor.

9. A method for providing jitter free execution of a set of instructions corresponding to multiple tasks by a microcontroller having a pipelined processor, comprising:
   executing instructions corresponding to a first task;
   interrupting the first task after a first predetermined amount of time elapses;
   commencing execution of a second task after a second predetermined amount of time lapses from the first task interrupt;
   interrupting the second task after the first predetermined amount of time lapses from the commencement of execution of the second task; and
   commencing execution of a third task after the second predetermined amount of time lapses.

10. The method of claim 9, wherein a current priority of the first task is compared with a current priority of the second task after the first predetermined amount of time lapses.

11. The method of claim 10, wherein an interrupt service subroutine evaluates the current priority of the first task as compared with the current priority of the second task.

12. A method for providing jitter free execution of a set of instructions corresponding to multiple tasks by a microprocessor having a pipelined processor comprising:
   executing instructions corresponding to a first task;
   interrupting the first task after a first predetermined amount of time elapses; and
   commencing execution of a second task after a second predetermined amount of time lapses from the first task interrupt.

* * * * *